United States Patent [19]

de Putter

[11] 4,131,541

[45] Dec. 26, 1978

[54] REMOVING COAGULABLE SUBSTANCES FROM AN AQUEOUS MEDIUM

[75] Inventor: Warner J. de Putter, Hardenberg, Netherlands

[73] Assignee: Wafilin B.V., Zwolle, Netherlands

[21] Appl. No.: 600,427

[22] Filed: Jul. 30, 1975

[30] Foreign Application Priority Data

Jul. 31, 1974 [NL] Netherlands .................. 7410323

[51] Int. Cl.² .............................................. B01D 13/00
[52] U.S. Cl. .............................. 210/23 F; 210/433 M; 426/489
[58] Field of Search .................... 426/489; 210/22, 23, 210/433 M

[56] References Cited

U.S. PATENT DOCUMENTS

| 2,190,176 | 2/1940 | Smith | 426/489 X |
| 2,559,459 | 7/1951 | Peebles et al. | 426/489 X |
| 3,228,876 | 1/1966 | Mahon | 210/22 |
| 3,684,520 | 8/1972 | Bickoff et al. | 426/489 X |
| 3,782,556 | 1/1974 | Murkes | 210/433 M X |
| 3,799,806 | 3/1974 | Madsen | 210/22 X |

OTHER PUBLICATIONS

Michaels, "New Separation Technique for the CPI", from *Chem. Eng. Progress*, vol. 64, No. 12, Dec. 1968, pp. 31–43.

*Primary Examiner*—Frank A. Spear, Jr.
*Attorney, Agent, or Firm*—Wilkinson, Mawhinney & Theibault

[57] ABSTRACT

A method for removing small quantities of coagulable substances from potato waste fruit water by means of a heating treatment, in such a way that, prior to heating, the fruit waste is subjected to an ultrafiltration at a pressure comprised between 5 and 10 Atm. until the protein concentration has increased to a value of at least 6%.

2 Claims, 1 Drawing Figure

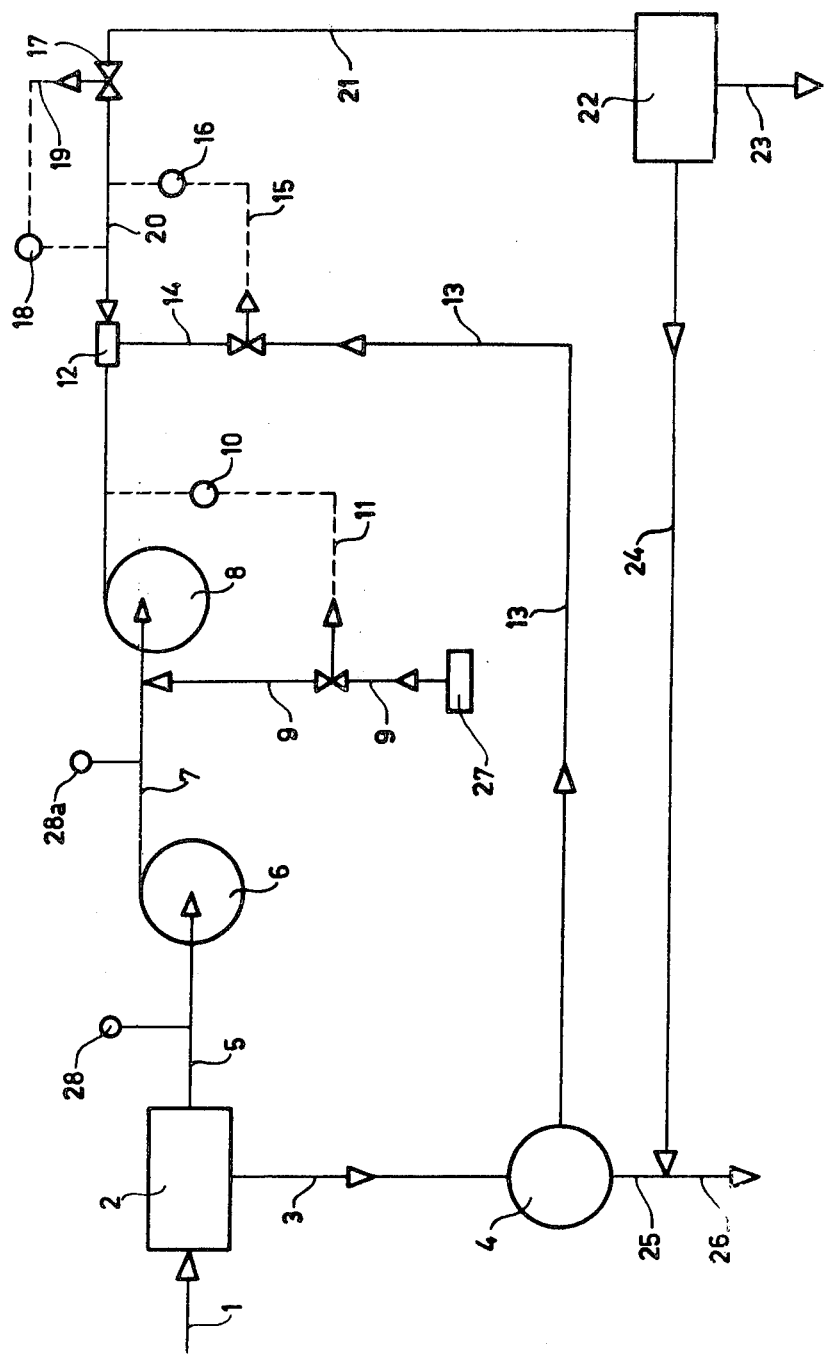

REMOVING COAGULABLE SUBSTANCES FROM AN AQUEOUS MEDIUM

DISCUSSION OF THE PRIOR ART

The present invention relates to a method for removing small quantities of heat coagulable substances from an aqueous medium.

Such a method for removing small quantities of proteins from potato fruit waste water produced in processing potatoes is commonly known. Proteins in such waste water, that is to say the liquid obtained in processing potatoes for the production of potato starch give namely rise to fermentation symptoms when the water is discharged to surface water and to development of a disagreeable smell. In view of increasing pollution of open water courses it is now no longer allowed to discharge liquids, like potato waste fruit water of the potato processing industry, directly, so as to avoid pollution of rivers and brooks with proteins which give rise to the formation of evil smelling substances. Besides the development of evil smelling vapors a great quantity of foam is formed on the courses which gives the surface of the river or brook an ugly appearance.

A very simple method for removing these proteins from waste water is a heating treatment, according to which the coagulable proteins precipitate. After precipitation of the proteins they can be filtered off, whereupon the aqueous medium can be discharged to the surface water.

By means of this heating operation a sufficient coagulation of the proteins is not always produced, presumably owing to the small quantities of proteins in such waste water. It may therefore occur that though the available proteins are for the greater part removed from the discharge water, the remaining concentrations still cause fermentation symptoms.

SUMMARY OF INVENTION

The present invention aims to provide a method which does not present this disadvantage and by which the waste water after a heating treatment is substantially devoid of proteins or at least contains less proteins, than according to the known methods, so that any risk of fermentation or other microbiological processes is excluded or at least decreased.

This is achieved by the arrangement that the aqueous medium prior to heating is subjected to an ultra filtration with a pressure ranging from 5 to 15 Atm. and in that the protein concentration is increased preferably to a value of at least 4%.

When such a method is performed almost all proteins may settle and none of them are discharged to the surface water.

The method as described above can be advantageously performed when discharging potato waste fruit water produced in processing potatoes for the production of potato starch.

The membrane filtration is mostly an ultrafiltration at a pressure ranging from 5 to 15 Atm., but preferably from 5–10 Atm.

In such membrane filtrations the aqueous medium is namely passed along a membrane which is permeable for water but not for proteins and other high molecular substances, which causes a concentration of proteins and other substances in the discharged medium, while permeate in the form of pure water or water containing low molecular weight substances as a permeate is obtained. This pure water or aqueous solution can again be used in the process of producing potato starch from potatoes.

For membrane filtration known membranes like cellulose-acetate membranes can be used, but other polymer membranes are also suitable.

In order to obtain an almost complete removal of coagulable substances from potato waste fruit water by heating, it is advisable to increase the protein concentration in the waste water to over 4% and preferably to at least 6%.

Prior to the separation of the coagulated protein the temperature of the heated concentrate is reduced by mixing the concentrate with part of the permeate of the ultrafiltration.

Thermal treatment of the concentrate obtained at the ultrafiltration stage is efficiently performed by mixing the concentrate with vapor in a system constructed of a positive displacement pump and a centrifugal pump.

Thus the efficiency of the protein coagulation and the subsequent separation is improved.

Thermal treatment of concentrated potato waste fruit water consists in that it is mixed with steam. In order to obtain easily coagulated proteins to be separated, the temperature of the mixture of steam and concentrate should be over 80° C. and preferably range from 100° C. to 120° C. For a proper separation of the protein after coagulation the mixture should be cooled to a temperature under 80° C. which may be achieved by e.g. mixing with a part of the permeate or with a liquid like water. The coagulated protein can be separated by means of a rotating filter or a decanting device.

Cooling is most favorable since then coagulation can be effected in very concentrated protein solutions without inclusion of polluting low molecular substances. Due to cooling by diluting with permeate or water no difficulties are experienced in the separation of the coagulated protein, which is due to a prevented sedimentation which phenomenon is sure to happen if the heated concentrate is cooled by means of a heat exchanger or by evaporation under pressure. Moreover, it is favorable in case of a further treatment, since after combining the liquid which remains after separation of the coagulated protein and the remaining permeate, the dry substance content is higher than in case cooling is effected by diluting with water. Another advantage is in that no heat exchanges or expansion vessels are required.

As mentioned hereinbefore it is advisable to use a temperature of at least 80° C. and preferably one ranging from 100° to 120° C. for the coagulation of the proteins.

Mixing can be effected with any rotating mixing system, a system consisting of two pumps being preferred, the last pump of which is a centrifugal pump which is used as a mixer. The concentrate is passed by means of a preceding pump, e.g. a positive displacement pump, into the suction pipe of a centrifugal mixer. Into this suction pipe is also introduced a flow of compressed steam. Mixing is effected at the impeller of the centrifugal pump.

The preceding pump is used in order to obtain a sufficient pressure that is to say about 3 Atm. in the centrifugal pump so as to avoid cavitation of the heated concentrate at the tops of the vanes of the impeller.

The centrifugal pump is preferably used as a mixer on account of its simple construction and of its availability in many versions. The mixing effect can moreover be easily enhanced by adapting the vanes of the impeller.

The steam and concentrate can also be mixed by using a multistage centrifugal pump and the introduction of a flow of steam into the last stage or stages. Another suitable system for effecting the coagulation consists of a pressure tank, provided with an agitator, into which steam and concentrate are introduced.

When performing an ultrafiltration, synthetic polymer membranes, preferably non-aromatic synthetic polymer membranes, are used which can be shaped into tubular membranes from a solution. Membranes of polyacrylonitril polymers or copolymers produce a very good result.

The used membranes advantageously have a flux of more than 3 cm3/cm2/h.

These membranes offer the advantage that they can excellently stand cleaning, a property which is necessary since they are exposed to treatment with a disinfecting liquid such as a bacteria filling substance, e.g. a chlorine containing agent in order to kill the bacteria which multiply in the membranes. By performing a cleaning or a disinfecting treatment by means of a hypochlorite, giving a concentration of 45 ppm chlorine to the cleaning liquid and by regularly repeating this treatment, an installation can operate properly and without any disturbances during a period of weeks, while a good flux and a high output are being maintained.

Moreover these membranes are Orlon and Dynel membranes, Orlon being a polyacrylonitril polymer and Dynel a copolymer of acrylonitril and vinylchloride.

BRIEF DESCRIPTION OF THE DRAWING

The drawing is a diagram of a method of the invention.

DESCRIPTION OF A PREFERRED EMBODIMENT

EXAMPLE I

Waste fruit water, obtained in processing industrial potatoes into starch, with a protein concentration of 0.6% and a total content of dry substance of 5% is passed through a membrane-filtration unit consisting of a plurality of supporting tubes which carry on their inside a non-woven layer on which a cellulose-acetate membrane is mounted. An over pressure of 10 Atm. is maintained when the waste water is passed, whereby water penetrates the cellulose-acetate membrane and is recovered via the non-woven layer, while the concentration of dry substance and as a consequence of protein in the waste water increases. After concentration of the waste water to a protein concentration of over 4%, in this case 6%, the liquid is subected to a heating treatment, whereby the proteins coagulate. These coagulated proteins are caused to settle or filtered off.

Suitable temperatures for heating are some 80° C. but obviously this temperature can be easily determined by means of simple tests.

After heating and separating the coagulated proteins the remaining liquid is discharged.

Although hereinbefore an increase of the protein concentration in waste water to over 4% is described, it is evident that under particular circumstances a raise of less than 4% suffices. This applies also to other proteins in aqueous media.

EXAMPLE II

Potato waste fruit water cleared of fibres by means of a decanting device (an unperforated bowl conveyor discharge centrifuge) is subjected to ultrafiltration by means of an ultrafiltration device provided with tubular ultrafilters from polyacrylonitril polymer, the pressure in the system amounting to 135 p.s.i. and the flux to 4 cm3/cm2/h. Prior to ultrafiltration the waste water is cleared from foam. The concentrate has a volume of ¼ the original volume of the waste water. The protein is coagulated by thermal treatment by pumping the concentrate by means of a positive displacement pump into the inlet of a centrifugal pump and by the introduction of steam at a pressure of 6 Atm.

This method is diagrammatically represented in the drawing. This drawing shows a supply line 1 for supplying potato waste fruit water to an ultrafiltration unit 2 from which the concentrate is passed through line 5 into the positive displacement pump 6. From pump 6 the concentrate is conveyed through 7 into the centrifugal pump 8 where it is mixed with superheated steam of 6 Atm. supplied through line 9 and provided by steam boiler 27. A temperature control 10 and 11 are presented for controlling the temperature of the mixture.

The mixture from the centrifugal pump is cooled at injector 12 by mixing with permeate from container 6 and supplied through lines 13 and 14. A line 14 and temperature control 15 are used for regulating the amount of permeate to be added at 12. The mixture with coagulated protein flows through line 21 to decantation vessel 22 from which protein is recovered by line 23 and liquid through line 24.

The liquid from line 23 is mixed with permeate flowing through line 25. The mixture is rejected through line 26.

The pressure regulators 28 and 28a maintain the desired pressure. Furthermore the apparatus comprises a line 19, wherein a pressure control 18 is present.

A part of permeate flowing through 13 may also flow through a valve into line 15 into line 20 after having passed a temperature control 16.

The positive displacement pump operates at such a rate that the pressure at the inlet of the centrifugal mixer amounts to about 4 Atm. At the outlet of the centrifugal mixer the temperature of the heated concentrate amounts to about 116° C. After leaving the centrifugal pump the heated concentrate is mixed with a quantity of permeate injected into the steam of concentrate, until the temperature of the mixture amounts to about 75°. The coagulated protein is separated by means of a decanting device, while the obtained material with a dry substance content of 38% is dried in a pneumatic dryer.

The remaining liquid can be mixed, after the protein has been separated with permeate, whereupon the mixture is worked up.

During the ultrafiltration the passage of potato fruit waste water is stopped after e.g. a 12 hour period, whereafter an aqueous sodium hypochlorite solution as disinfecting liquid is passed through the membrane tube in order to fill bacteria etc. The hypochlorite solution provides 45 ppm chlorine to the disinfecting liquid.

EXAMPLE III

The experiment according to Examine II is repeated with protein containing water coming from the fish processing industry. After heating coagulation a very usable protein is obtained as well as a less polluted waste water concentrate.

What I claim is:

1. A process for removing quantities of heat coagulable substances from an aqueous medium containing waste fruit water produced in processing potatoes the coagulation of which is effected by rapidly heating to a temperature of at least 80° C. and preferably ranging from 100° to 120° C., subjecting the aqueous medium to an ultrafiltration effected with membranes having a flux of more than 3 cm3/cm2/h and preferably 4cm3/cm2/h with a pressure ranging from 5–15 atmospheres prior to heating to increase portein concentration to a value of at least 4%.

2. The process according to claim 1 wherein the ultra-filtration is regularly interrupted for a treatment with a disinfecting liquid which comprises a hypochlorite solution.